United States Patent [19]
Higuchi et al.

[11] Patent Number: 5,494,865
[45] Date of Patent: Feb. 27, 1996

[54] CRYSTALLINE CERAMIC FIBER AND METHOD OF MANUFACTURING SAME

[75] Inventors: Yoshikatsu Higuchi; Masanori Okabe; Yasunobu Kawakami, all of Saitama, Japan

[73] Assignee: Honda Giken Kogyo Kabushiki Kaisha, Tokyo, Japan

[21] Appl. No.: 224,562

[22] Filed: Apr. 7, 1994

[30]     Foreign Application Priority Data

Apr. 8, 1993 [JP] Japan .................................. 5-106148

[51] Int. Cl.$^6$ .................................................. C04B 35/58
[52] U.S. Cl. .................................................. 501/95; 501/97
[58] Field of Search ......................... 501/97, 95; 423/409

[56]                References Cited

U.S. PATENT DOCUMENTS 4,631,260  12/1986  Bartos et al. ........................ 501/88
4,650,773   3/1987  Okamura et al. .................... 501/97
4,870,035   9/1989  Takamizawa et al. ............... 501/88

FOREIGN PATENT DOCUMENTS 4238874  8/1992  Japan .

*Primary Examiner*—C. Melissa Bonner
*Attorney, Agent, or Firm*—Birch, Stewart, Kolasch & Birch

[57]                    ABSTRACT

A crystalline ceramic fiber suitable for reinforcing a formed ceramic body is produced by crystallizing an amorphous ceramic fiber composed of silicon and nitrogen by heat treatment within non-oxide ceramic powder in an inert gas atmosphere. The amorphous ceramic fiber is produced by thermally decomposing a pre-ceramic fiber produced by melting and spinning polysilazane. The amorphous ceramic fiber is mainly composed of silicon, nitrogen, carbon, and oxygen, and has such a composition that silicon has a 40 to 60 weight %, nitrogen has a 5 to 40 weight %, carbon has a 20 weight % or lower, and oxygen has a 50 weight % or lower.

8 Claims, 1 Drawing Sheet

CRYSTALLINE CERAMIC FIBER AND METHOD OF MANUFACTURING SAME

BACKGROUND OF THE INVENTION

1. Field of the Invention

The present invention relates to a crystalline ceramic fiber and a method of manufacturing such a crystalline ceramic fiber, and more particularly to a ceramic fiber suitable for use as a reinforcing material for a formed body of non-oxide ceramic such as silicon nitride or the like and a method of manufacturing such a ceramic fiber.

2. Description of the Prior Art

Sintered ceramic bodies are generally manufactured by forming ceramic powder into a certain shape, known as a green body, and then firing the green body. Since a ceramic material cannot easily be shaped once it is fired, it is formed into a desired shape before it is fired.

A formed ceramic body may be produced by any of various known processes. For example, a ceramic material may be pressed into a desired shape by a press or injection-molded into a desired shape by an injection molding machine. A ceramic slurry may be molded by a gypsum mold according to slip casting. Furthermore, a ceramic material may be pressed into a desired shape by a rubber press according to cold static hydraulic press. In order to produce a formed ceramic body having a small wall thickness or a complex shape, it is preferable to shape a ceramic slurry or a mixture of ceramic slurry and resin by slip casting, injection molding, or a process using a doctor blade.

In the slip casting process, a ceramic powder is dispersed in water, and the resultant slurry is put into a gypsum mold. The gypsum mold then absorbs and passes the water from the slurry, thereby producing a formed green body which is solidified.

According to the slip casting process, however, even if a binder or the like is mixed in such a ceramic powder, since the binding force between ceramic particles is not necessarily large, the mechanical strength of the formed body is not so large, and the formed body tends to be broken. When the ceramic slurry is dehydrated and dried in the gypsum mold, the formed body shrinks and hence is liable to crack. Therefore, it has been difficult to manufacture formed ceramic bodies of a small wall thickness or a complex shape without breakage or cracking.

In an attempt to solve the problem of breakage or cracking of formed ceramic bodies, it has been proposed to reinforce a formed ceramic body of silicon nitride with ceramic fibers that are produced by melting and spinning polysilazane (see, for example, Japanese laid-open patent publication No. 4-238874). It has been found, however, that a final sintered ceramic body reinforced with amorphous ceramic fibers produced by such a known process is apt to suffer defects therein.

Sintered ceramic bodies reinforced with crystalline ceramic fibers are prevented from becoming defective. However, when amorphous ceramic fibers produced by melting, spinning, and heating polysilazane are heat-treated simply in an inert atmosphere such as of nitrogen, as the fibers are crystallized, a number of whiskers are produced due to a vapor phase reaction, and surround the fibers, thus preventing the crystalline fibers from being extracted. Furthermore, before fibers of α- or β-$Si_3N_4$ suitable for reinforcing formed ceramic bodies of silicon nitride are formed, the decomposition of the ceramic fibers progresses to the extent that hollow fibers will finally be produced.

SUMMARY OF THE INVENTION

It is therefore an object of the present invention to provide a crystalline ceramic fiber which is suitable to reinforce a formed ceramic body to make the same sufficiently strong mechanically and resistant to cracking thereby preventing the formed ceramic body from being broken or cracking, and which can increase the high-temperature strength of a sintered ceramic body that is reinforced by the crystalline ceramic fiber.

Another object of the present invention is to provide a method of manufacturing a crystalline ceramic fiber by melting, spinning, and thermally decomposing polysilazane into an amorphous ceramic fiber, and then heat-treating the amorphous ceramic fiber while preventing the same from being decomposed.

The inventors have found that when an amorphous ceramic fiber composed of silicon and nitrogen is heat-treated within non-oxide ceramic powder in an inert gas atmosphere, the amorphous ceramic fibers are prevented from being decomposed, whiskers are also prevented from being generated due to a vapor phase reaction, and hence the amorphous ceramic fiber can reliably be crystallized.

According to the present invention, there is provided a crystalline ceramic fiber comprising an amorphous ceramic fiber composed of silicon and nitrogen and crystallized by heat treatment within non-oxide ceramic powder in an inert gas atmosphere. The amorphous ceramic fiber may be produced by thermally decomposing a pre-ceramic fiber produced by melting and spinning polysilazane. The amorphous ceramic fiber is mainly composed of silicon, nitrogen, carbon, and oxygen, and has such a composition that silicon has a 40 to 60 weight %, nitrogen has a 5 to 40 weight %, carbon has a 20 weight % or lower, and oxygen has a 50 weight % or lower.

According to the present invention, there is also provided a method of manufacturing a crystalline ceramic fiber, comprising the steps of melting and spinning polysilazane into a pre-ceramic fiber, thermally decomposing said pre-ceramic fiber into an amorphous ceramic fiber in either an inert gas atmosphere, a reducing gas atmosphere, a mixture thereof, or a vacuum, and heat-treating said amorphous ceramic fiber within non-oxide ceramic powder in an inert gas atmosphere, thereby crystallizing said amorphous ceramic fiber.

The amorphous ceramic fiber may be heat-treated at a temperature ranging from 1500° to 2000° C., e.g., 1500° C.

The amorphous ceramic fiber may be heat-treated for a period of time ranging from 0.5 to 4 hours, e.g., 0.5 hour.

The inert gas atmosphere may comprise either an argon gas, a nitrogen gas, or a mixture thereof, and the non-oxide ceramic powder may comprise silicon nitride powder.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
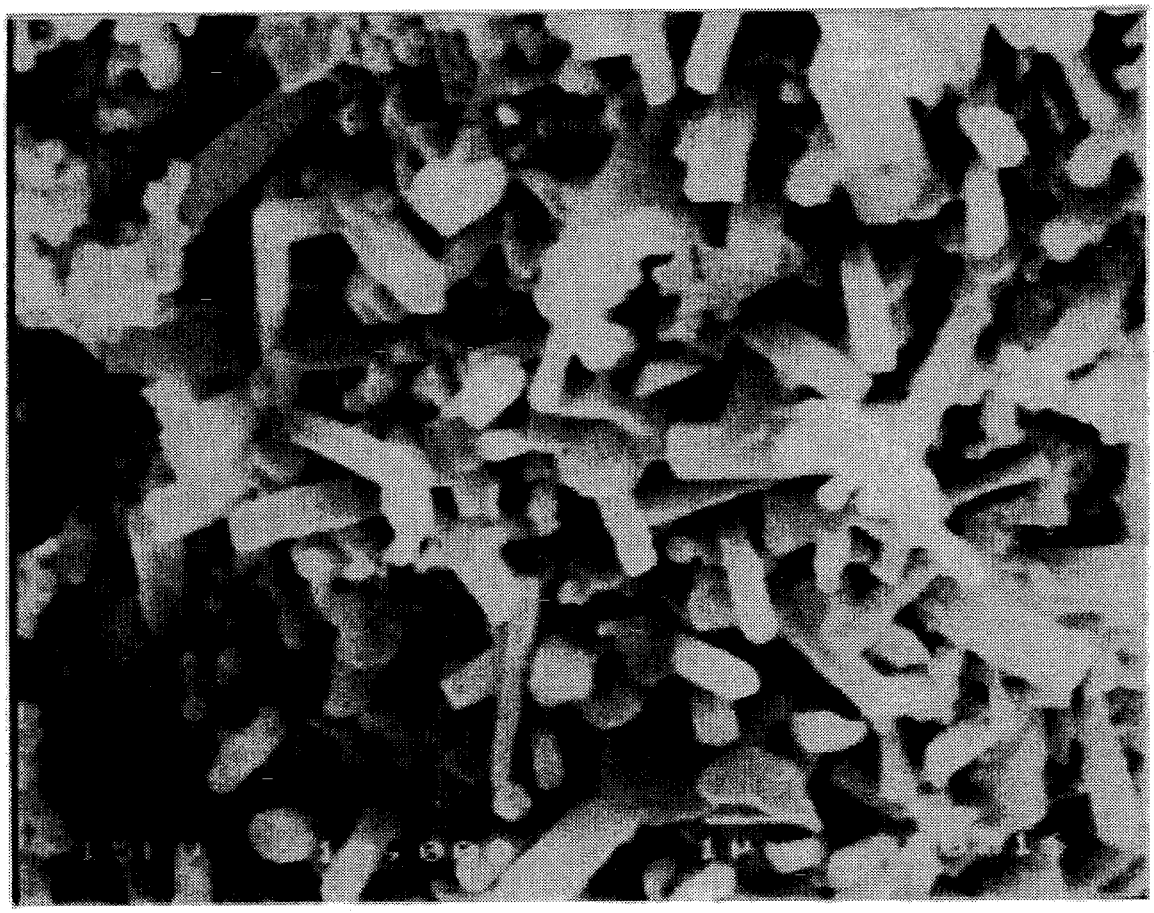
FIG. 1 is an electron microscope photographic representation showing the crystalline structure of a surface of a crystalline ceramic fiber heat-treated in a powder of silicon nitride according to the present invention.

MANUFACTURE OF PRE-CERAMIC FIBER:

Polysilazane is preferable as a polymer from which to form a pre-ceramic fiber. Polysilazane can be synthesized from cyclosilazane $(R_2SiNR)_3$ or the like where R represents H or alkyl group, and chlorosilane $(R_nSiCl_{4-n})$ where n=0, 1, 2, 3, and R represents H or alkyl group.

A method of synthesizing polysilazane from hexamethylcyclotrisilazane $(Me_2SiNH)_3$ and trichloromethylsilane will be described below by way of example. First, the hexamethylcyclotrisilazane and the trichloromethylsilane are mixed with each other in an anhydrous inert atmosphere. At this time, the hexamethylcyclotrisilazane and the trichloromethylsilane should be mixed preferably at a molar ratio ranging from 1:1 to 1:5, and more preferably at a molar ratio of about 1:3. Then, the mixture is refluxed with heat to allow the hexamethylcyclotrisilazane to split, generating a chlorosilazane oligomer. The process of producing the chlorosilazane oligomer from the hexamethyl-cyclotrisilazane and the trichloromethylsilane is completed in about 12 hours.

The chlorosilazane oligomer is then dissolved in a solvent such as of cyclohexane or the like, and an ammonia gas is injected into the produced solution to carry out ammonolysis. Preferably, the ammonia gas should be injected at a rate of about 70 liters/hour for 3 to 4 hours. The chlorosilazane oligomer is converted into an aminosilazane oligomer by the ammonolysis. Any precipitated ammonium chloride that is produced as a by-product at this time is removed by suction and filtration or the like.

Thereafter, the aminosilazane oligomer is polycondensated while being heated to about 250° to 400° C. in either an inert gas such as a nitrogen gas or a vacuum, thereby producing thermoplastic polysilazane. The softening point of the polysilazane can be adjusted by changing the heating condition. If the polysilazane will be formed into fiber, then it is preferable to set the softening point of the polysilazane to a temperature range of from about 50° to 200° C.

To form the polysilazane into fiber, the polysilazane is kept at a temperature of its softening point or higher, so that it is melted and can be spun. The formed polysilazane fiber should preferably be wound at a rate ranging from about 25 to 400 meters/minute. In this manner, formed polysilazane fiber has a diameter ranging from 5 to 30 μm.

MANUFACTURE OF AMORPHOUS CERAMIC FIBER:

The polysilazane fiber is held in contact with steam of water at a temperature ranging from 40° to 90° C. and thereafter fired at a temperature ranging from 800° to 1400° C. for a time period ranging from about 30 minutes to 4 hours in. either an inert gas such as an argon (Ar) gas, an $N_2$ gas, or the like, a reducing gas atmosphere such as of a $NH_3$ gas, an $H_2$ gas, or the like, a mixture of these inert and reducing gases, or a vacuum, thus producing an amorphous ceramic fiber mainly composed of silicon (Si), nitrogen (N), carbon (C), and oxygen (O).

The amorphous ceramic fiber produced in the manner described above has such a composition that Si has a 40 to 60 weight %, N has a 5 to 40 weight %, C has a 20 weight % or lower, and O has a 50 weight % or lower.

MANUFACTURE OF CRYSTALLINE CERAMIC FIBER:

The amorphous ceramic fiber thus produced and non-oxide ceramic powder are mixed with each other, and the mixture is heat-treated into a crystalline form in an inert gas atmosphere. At this time, the amorphous ceramic fiber should preferably be embedded in the non-oxide ceramic powder so that any surface of the amorphous ceramic fiber is not exposed out of the non-oxide ceramic powder. The amorphous ceramic fiber and the non-oxide ceramic powder may be mixed with each other at a suitable ratio.

The non-oxide ceramic powder is not limited to any particular ceramic powder insofar as it does not contain oxygen. Specifically, the non-oxide ceramic powder may be of either a nitride such as silicon nitride, aluminum nitride, titanium nitride, boron nitride, or the like, or a carbide such as silicon carbide, titanium carbide, tungsten carbide, or the like, or a mixture of any of these materials. Preferably, the non-oxide ceramic powder should be silicon nitride powder. The non-oxide ceramic powder should preferably have an average particle diameter ranging from 0.1 to 5 μm.

The mixture of the amorphous ceramic fiber and the non-oxide ceramic powder is then pressed to a density of about 1.3 under a pressure ranging from 10 to 400 kg/cm² by a pressing machine. Thereafter, the pressed mixture should preferably be heat-treated in an inert gas atmosphere such as an argon gas, a nitrogen gas, or the like, or a mixed gas atmosphere to 9 kg/cm².

Preferably, the heat treatment of the pressed mixture should be carried out at a temperature ranging from 1500° to 2000° C. for a period of time ranging from 0.5 to 4 hours. If the temperature of the heat treatment were lower than 1500° C., then the amorphous ceramic fiber would not completely be crystallized. If the temperature of the heat treatment were in excess of 2000° C. then the amorphous ceramic fiber would be decomposed. If the heat treatment were conducted for a period of time shorter than 0.5 hour, then the crystalization of the amorphous ceramic fiber would not sufficiently progress. If the heat treatment were conducted for a period of time longer than 4 hours, then the crystal grain would become too large to keep the ceramic in fibrous form.

Through the above heat treatment, there is obtained a crystalline ceramic fiber mainly composed of $\beta\text{-}Si_3N_4$. The generation of $Si_3N_4$ appears to occur according to the following mechanism: The amorphous ceramic fiber to be heat-treated contains oxygen especially in its surface because $SiO_2$ remains therein. When the amorphous ceramic fiber is heat-treated, the $SiO_2$ component is first melted, then $\alpha\text{-}Si_3N_4$ in the fiber is dissolved, and finally the crystal of $\beta\text{-}Si_3N_4$ is generated. Though the amorphous ceramic fiber contains carbon, it is discharged as CO or $CO_2$ from the amorphous ceramic fiber by the heat treatment.

Now, the present invention will be described with respect to certain Inventive and Comparative Examples.

Inventive Example 1:

Polysilazane was melted by being heated to 120° C., and spun at a winding speed of 50 meters/minute in a nitrogen atmosphere, thereby producing a polysilazane fiber having an average diameter of 14 μm.

The polysilazane fiber was then held in contact with steam of water at 40° C., and fired (thermally decomposed) in a nitrogen gas at 1200° C. for 0.5 hours, thus producing an amorphous ceramic fiber having an average diameter of 10 μm. The amorphous ceramic fiber had a composition of Si: 51 weight %, N: 16 weight %, C: 15 weight % or lower, and O : 18 weight %.

1 g of the produced amorphous ceramic fiber was embedded in silicon nitride powder having an average diameter of 0.5 μm, and then pressed under a pressure of 200 kg/cm₂.

Thereafter, the pressed mixture was heat-treated at 1900° C. in a nitrogen gas atmosphere for 2 hours.

After the heat treatment, the surface of the ceramic fiber embedded in the silicon nitride powder was observed with a scanning electron microscope. The observation indicated that the ceramic fiber had a column- or needle-like polycrystalline form. The sole figure shows an electron microscopic photograph (magnitude:×10,000) which illustrates the crystalline structure of the surface of the heat-treated ceramic fiber. An X-ray diffraction inspection of the ceramic fiber showed that it was mainly composed of $\beta$-$Si_3N_4$.

Inventive Example 2

An amorphous ceramic fiber was heat-treated in the same manner as in Inventive Example 1 except that the temperature of the heat treatment was 1500° C. After the heat treatment, a ceramic fiber composed of polycrystalline silicon nitride partly of the $\beta$-type was produced in the silicon nitride powder.

Comparative Example 1:

An amorphous ceramic fiber was prepared and heat-treated in the same manner as in Inventive Example 1. However, the fiber was not embedded in silicon nitride powder. After the heat treatment, ceramic fiber was not detected. It appeared that any ceramic fiber produced was decomposed by the heat treatment.

Comparative Example 2:

An amorphous ceramic fiber was heat-treated in the same manner as in Inventive Example 2 except that it was not embedded in silicon nitride powder. After the heat treatment, a great many whiskers were found around the ceramic fiber. The ceramic fiber itself had a mixture of amorphous structure and $\beta$-$Si_3N_4$.

Comparative Example 3:

An amorphous ceramic fiber was heat-treated in the same manner as in Inventive Example 1 except that powder of an oxide such as $Al_2O_3$, $Y_2O_3$, or $HfO_2$ was employed in place of the silicon nitride powder. After the heat treatment, the existent of any ceramic fiber was confirmed in the oxide powder.

According to the method of the present invention, it is possible to crystallize an amorphous ceramic fiber well which has been produced by firing polysilazane.

The crystalline ceramic fiber according to the present invention is suitable for use as a reinforcement for a formed ceramic body of silicon nitride or the like. When formed ceramic bodies reinforced with the crystalline ceramic fiber according to the present invention are fired, no defects are introduced into the sintered ceramic bodies.

Although certain preferred embodiments of the present invention has been shown and described in detail, it should be understood that various changes and modifications may be made therein without departing from the scope of the appended claims.

What is claimed is:

1. A method of manufacturing a crystalline ceramic fiber, comprising the steps of:

melting and spinning polysilazane into a pre-ceramic fiber;

thermally decomposing said pre-ceramic fiber into an amorphous ceramic fiber in either an inert gas atmosphere, a reducing gas atmosphere, a mixture thereof, or a vacuum; and heat-treating said amorphous ceramic fiber within non-oxide ceramic powder in an inert gas atmosphere, thereby crystallizing said amorphous ceramic fiber.

2. The method according to claim 1, wherein said amorphous ceramic fiber is heat-treated at a temperature ranging from 1500° to 2000° C.

3. The method according, to claim 2, wherein said amorphous ceramic fiber is heat-treated at a temperature of 1900° C.

4. The method according to claim 2, wherein said amorphous ceramic fiber is heat-treated by being fired at a temperature of 1500° C.

5. The method according to claim 1, wherein said amorphous ceramic fiber is heat-treated for a period of time ranging from 0.5 to 4 hours.

6. The method according to claim 5, wherein said amorphous ceramic fiber is heat-treated by being fired for 0.5 hour.

7. The method according to claim 1, wherein said non-oxide ceramic powder comprises silicon nitride powder.

8. A method for manufacturing a crystalline ceramic fiber, comprising heat treating an amorphous ceramic fiber containing silicon and nitrogen within a non-oxide ceramic powder in the presence of an inert gas atmosphere.

* * * * *